United States Patent
Bodelin et al.

[11] Patent Number: 5,873,524
[45] Date of Patent: *Feb. 23, 1999

[54] PROCESS AND DEVICE FOR SPRAYING A LIQUID PRODUCT

[75] Inventors: Pierre Bodelin, Vanves; Serge Laurenceau, Versailles; Patrick Recourt, Margoussis; Lahcen Ougarane, Montigny Le Bretonneux, all of France

[73] Assignee: L'Air Liquide, Societe Anonyme Pour L'Etude Et L'Exploitation Des Procedes Georges Claude, France

[ * ] Notice: This patent issued on a continued prosecution application filed under 37 CFR 1.53(d), and is subject to the twenty year patent term provisions of 35 U.S.C. 154(a)(2).

[21] Appl. No.: 687,041

[22] Filed: Jul. 25, 1996

[30] Foreign Application Priority Data

Jul. 28, 1995 [FR] France .................................. 95 09199

[51] Int. Cl.$^6$ ................ B05B 1/28; B05B 7/06; F23D 11/10
[52] U.S. Cl. .................. 239/8; 239/290; 239/419; 239/419.3; 239/422; 239/423; 239/424; 239/428
[58] Field of Search .................. 239/8, 290, 398, 239/418, 419, 419.3, 421, 422, 423, 424, 427, 427.3, 428

[56] References Cited

U.S. PATENT DOCUMENTS

| | | | |
|---|---|---|---|
| 792,265 | 6/1905 | Higgins | 239/419 |
| 1,279,315 | 9/1918 | Foerst | 239/424 X |
| 2,565,696 | 8/1951 | Moller et al. | 239/419.3 X |
| 3,035,775 | 5/1962 | Edwards et al. | 239/421 X |
| 3,533,558 | 10/1970 | Masters | 239/424 X |
| 3,662,960 | 5/1972 | Mitchell et al. | 239/428 X |
| 3,805,869 | 4/1974 | Winter et al. | 239/418 X |

FOREIGN PATENT DOCUMENTS

| | | |
|---|---|---|
| 0 105 493 | 4/1984 | European Pat. Off. . |
| 0 593 171 | 4/1994 | European Pat. Off. . |
| 672441 | 5/1952 | United Kingdom . |

*Primary Examiner*—Andres Kashnikow
*Assistant Examiner*—Robin O. Evans
*Attorney, Agent, or Firm*—Burns, Doane, Swecker & Mathis, L.L.P.

[57] ABSTRACT

The invention relates to a device and a process for spraying a product, especially a liquid fuel, into a working space which is external to the device. The device includes a nozzle for prespraying the liquid fuel into a confinement chamber and an outlet for ejection of a presprayed mixture into the working space. An additional pipe is provided for ejection of a gaseous spraying stream into the presprayed mixture inside the working space, at the outlet which ejects the presprayed mixture. The invention is particularly applicable to burners for glass melting furnaces.

18 Claims, 1 Drawing Sheet

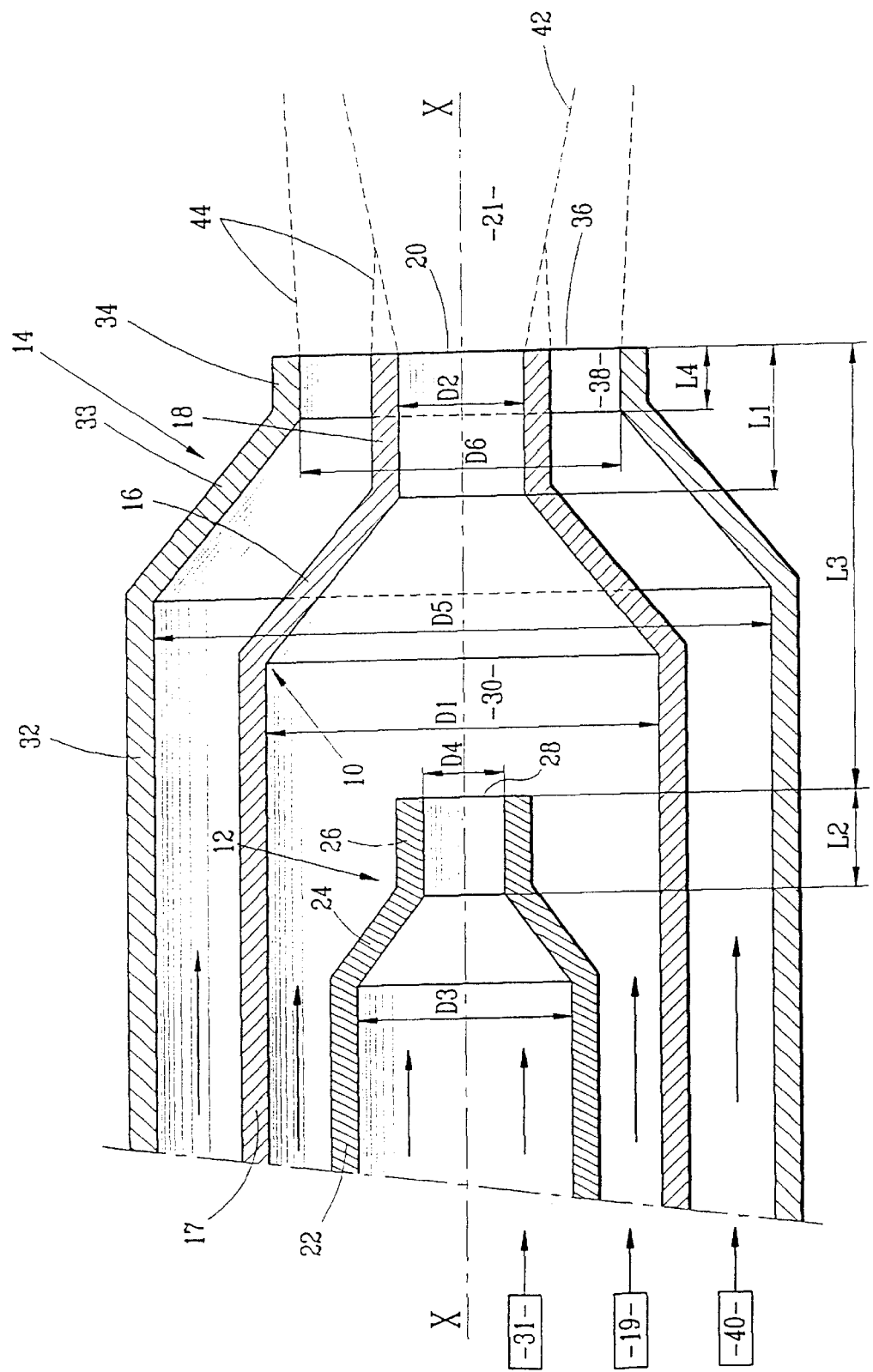

PROCESS AND DEVICE FOR SPRAYING A LIQUID PRODUCT

BACKGROUND OF THE INVENTION

1. Field of the Invention

The present invention relates to a process and a device for spraying a liquid product, especially a liquid fuel, into a working space. It applies in particular to the burners for glass melting furnaces.

The pressures which are referred to below are relative pressures.

The invention relates especially to a process for spraying a liquid product into a working space, of the type in which a prespraying of the liquid product is carried out inside a prespraying space other than the working space and a spraying of the presprayed mixture is carried out by making use of a gaseous spraying stream.

The invention also relates to a device for spraying a liquid product into a working space external to the said device, of the type comprising means for prespraying the liquid product, means for feeding the prespraying means with liquid product to be sprayed and means for spraying the presprayed mixture.

2. Description of the Related Art

Processes and devices making it possible to spray or atomize a liquid fuel, especially heavy fuel oil, into fine droplets are known. These droplets, brought into contact with an oxidant, for example oxygen, enable a flame to be maintained.

The characteristics of the flame obtained at the outlet of the spraying device depend on the quality of the spraying of the liquid, in particular on the size of the droplets obtained and on the statistical distribution of their diameters. Furthermore, the nature of the flame obtained also depends on the speed of ejection of the sprayed fluid at the outlet of the spraying device.

Depending on the spraying characteristics, the flames obtained may be soft or hard and may be attached to the end of the spraying device or else detached.

Furthermore, in the application to glass melting furnaces, a device for spraying a liquid fuel must be fit to resist the high temperatures of the order of 1400° C. to 1700° C. prevailing in the furnace. In particular, such a device must be capable of withstanding these temperatures for a certain period of time when it is not in operation. The known spraying processes and devices satisfy the conditions described above only in an imperfect or partial manner.

For example, there is a known spraying device with twin atomizing, comprising a first prespraying chamber into which a prespraying fluid and a liquid fuel are introduced. The outlet of this prespraying chamber opens into a second spraying chamber comprising entry openings for a gaseous spraying stream. The outlet of this second spraying chamber opens into the working space in which the sprayed fuel is inflamed. Such a device presents an explosion risk due to the presence of sprayed fuel in the two consecutive internal spraying chambers, the last one of which is in communication with the working space where the flame is established.

Furthermore, this device is very poorly protected against attack by heat.

SUMMARY OF THE INVENTION

The aim of the present invention is to propose a process and a device for spraying a liquid product, especially a liquid fuel, making it possible, at a given fuel flow rate, to permit the adjustment of the flame characteristics, and in particular to obtain an attached, long and soft flame, while resisting the high temperatures prevailing in a furnace. To this end, the subject of the invention is a process for spraying a liquid product, especially a liquid fuel, into a working space, of the above-mentioned type, characterized in that the presprayed mixture is ejected directly from the said prespraying space into the said working space, the said spraying being performed in this working space.

The process may exhibit one or more of the following characteristics:

- the prespraying of the liquid is obtained by making use of a gaseous prespraying stream;
- the prespraying of the liquid is carried out in a confinement chamber provided with an outlet for ejection of the presprayed mixture opening out into the said working space and into which are introduced, centrally, the gaseous prespraying stream and, annularly, the liquid product;
- the spraying of the presprayed mixture is carried out immediately at the outlet of the said confinement chamber;
- the pressure prevailing inside the confinement chamber is from 1 to 5 bars higher than the pressure prevailing in the working space;
- the ratio of the flow rate of the gaseous prespraying stream to the flow rate of the gaseous spraying stream is between 1 and 5;
- the gas compositions of the prespraying and spraying streams are identical; and
- the speed of the gaseous spraying stream introduced into the working space is between 5 m/s and 120 m/s.

Another subject of the invention is a device for spraying a liquid product, especially a liquid fuel, into a working space external to the said device, of the above-mentioned type, characterized in that the said means for prespraying comprise an outlet for ejection of the presprayed mixture opening out directly into the working space and in that the means for spraying include means for ejection of a gaseous spraying stream into the presprayed mixture inside the working space, at the outlet of the means for prespraying.

The device may have one or more of the following characteristics:

- the means for ejection of the spraying stream open out radially outside the said ejection outlet;
- the outlet for the means for ejection of the spraying stream is distributed annularly around the said ejection outlet;
- the means for ejection of the spraying stream comprise a feed pipe for gaseous spraying stream opening out into the working space and in which the means of prespraying are received;
- the outlets of the means for prespraying and of the means for ejection of the spraying stream are placed substantially in the same plane which is substantially perpendicular to the direction of flow of the stream of the sprayed mixture;
- the means for prespraying comprise a nozzle for ejection of a gaseous prespraying stream and means for establishing the said gaseous prespraying stream;
- the means for feeding liquid product comprise an emerging pipe inside which is placed the said nozzle for ejection of the gaseous prespraying stream, which nozzle has its ejection end placed set back from the end of the pipe which forms the ejection outlet of the means for prespraying;

the liquid product feed pipe decreases in diameter towards the said ejection outlet, thus defining a confinement chamber in which the prespraying is carried out;

the outlet diameter of the said nozzle is between a quarter of and quadruple the outlet diameter of the said means for prespraying;

the nozzle comprises an outlet end of reduced diameter preventing the back-filling of the latter in the event of interruption in the prespraying fluid feed; and it comprises means for adjusting the flow rates of the gaseous prespraying and spraying streams.

BRIEF DESCRIPTION OF THE DRAWING

The invention will be understood better on reading the description which is to follow, given solely by way of example and made with reference to the single figure which is a partial diagrammatic view in lengthwise section of a device for spraying according to the invention.

DETAILED DESCRIPTION OF THE PREFERRED EMBODIMENT

The device for spraying fuel oil, shown in the single figure, is generally of a revolution of axis X—X. It is suitable for producing at the outlet a sprayed mixture which has droplets with a mean diameter of approximately 100 μm which are distributed over an extensive range of diameters around this mean value. It is suitable for being used in combination with means, or for additional feeding with oxidant, for example oxygen. These means form, for example, an annular vein around the spraying device. They then comprise a conduit of circular section placed directly in a furnace brick, typically of a glass melting furnace, inside which the spraying device is placed axially. These means for feeding oxidant may also be formed by an oxygen lance placed beside the spraying device.

The device shown comprises essentially a pipe 10 for feeding liquid fuel, in this case fuel oil, inside which is placed coaxially a nozzle 12 for ejection of a gaseous prespraying stream, and an external pipe 14, placed coaxially around the pipe 10 and suitable for ejection of a gaseous spraying stream at its open end. The spraying and prespraying gases are, for example, air or steam and may come from the same source if they are identical.

The liquid fuel feed pipe 10 is made of brass and is between 1 and 6 mm in thickness. Towards its end it has a length 16 of gradually decreasing diameter in the direction of flow of the liquid fuel, from a main length 17 of nominal diameter D1 to a cylindrical end length 18 of reduced diameter D2. This end length has a diameter equal to 2 mm and is more than 10 mm in length (marked L1).

The upstream end of the pipe 10 is connected to means 19 for feeding liquid fuel, for example a pump, the delivery pressure of which is higher than 1.5 bar.

The free end 20 of the pipe 10 opens out directly inside a working space 21 which is external to the said spraying device and in which the flame is established, the inner space of the furnace in the example being considered.

The nozzle 12 is made of brass and has a cylindrical main length 22 of axis X—X and of large diameter D3, extended towards the outlet of the nozzle by a length 24 of gradually decreasing diameter in the direction of flow of the prespraying gas. The length 24 itself is extended by a cylindrical end length 26 of diameter D4, smaller than D3, and its length L2 is, for example, equal to 2 mm.

The nozzle 12 is placed inside the pipe 10 along the axis X—X and its emerging end 28 is directed towards the outlet 20 of the pipe 10. This end 28 is placed set back from the end 20 and is separated from the latter by a distance marked L3.

A confinement chamber 30 is thus defined inside the pipe 10 between the outlet ends 28 and 20 of the nozzle 12 and of the pipe 10 respectively. It defines a space for prespraying of the liquid fuel.

The distance L3 is, for example, equal to 70 mm. It must be sufficiently large to ensure efficient prespraying of the liquid fuel by the gaseous stream emerging from the nozzle 12, but it must nevertheless remain smaller than 200 mm to prevent any phenomenon of coalescence of the drops within the mixture. The main length 22 is connected upstream to means 31 for establishing a gaseous prespraying stream, for example a compressor, which include means of any known type for adjusting the flow rate of this gaseous stream.

The outer pipe 14 for conveying the gaseous spraying stream is made, for example, of stainless steel and is placed axially around the pipe 10. It comprises a cylindrical main length 32 of diameter D5 connected by a length 33 of gradually decreasing diameter in the direction of the flow of the gaseous stream to a cylindrical end length 34 of diameter D6 and of length L4. The length 34 surrounding the length 18 defines, with the latter, an annular outlet conduit 38 for the gaseous spraying stream. The end 36 of the end length opens out directly into the working space and is placed strictly in the same plane lying substantially perpendicularly to the direction of ejection of the spraying device, as the outlet end 20 of the confinement chamber 30.

The upstream end of the main length 32 is connected to means 40 for establishing the gaseous spraying stream, for example a compressor, which include means of any known type for adjusting the flow rate of this gaseous stream. The means for adjusting the flow rate of the spraying gas may be combined with those for the prespraying gas, in particular when both these gases are identical and come from the same source. Furthermore, these means for adjusting the flow rate are suitable, as a function of the cross-section of the outlet conduit 38, for obtaining a gaseous spraying stream which has an ejection speed of approximately between 5 m/s and 120 m/s.

In operation, the means for establishing the gaseous prespraying and spraying streams are adjusted so that the ratio of the flow rate of the gaseous prespraying stream to the flow rate of the gaseous spraying stream is in a range of approximately from 1 to 5.

The liquid fuel moving in the space included between the pipe 10 and the nozzle 12 is presprayed inside the chamber 30 under the effect of the gaseous prespraying stream ejected at the outlet of the nozzle 12. In order to obtain satisfactory prespraying the diameter D2 of the length 18 is sized so as to make the pressure inside the confinement chamber 30 from 1 to 5 bars higher than the pressure prevailing in the working space 21.

Under the effect of the pressure prevailing inside the chamber 30 and of the speed of the gaseous prespraying stream, the mixture thus presprayed is ejected at the outlet end 20 directly inside the working space 21 following a central jet 42 shown diagrammatically as broken lines.

The gaseous spraying stream ejected at the outlet 36 of the outer pipe 34 directly into the working space 21 forms a substantially annular jet 44 shown diagrammatically as broken lines. It meets the presprayed mixture emerging from the outlet 20 outside the spraying device in the working space 21 and completes the spraying thereof. In particular, the outer gaseous spraying stream ensures additional atomization which shifts the particle size distribution of the presprayed mixture towards smaller droplet diameters. In such a spraying device the liquid fuel is sprayed for a first time inside the confinement chamber 30 forming the prespraying space and the mixture thus presprayed undergoes a subsequent outer spraying inside the working space 21 in which the flame is established.

The means for adjusting the flow rate of the gaseous prespraying and spraying streams make it possible to determine the characteristics of the flame obtained at the outlet of the spraying device.

In addition, the gaseous spraying stream ejected at the outlet 36 around the presprayed mixture ensures the protection of the end of the length 18 against attack by heat, due especially to transfer by radiation. Thus, any risk of cooking on the end 38 is removed, since the gaseous spraying stream provides continual cooling and forms a protective layer downstream of this end.

Moreover, the gaseous spraying vein 44, which surrounds the presprayed mixture 42 at the outlet of the spraying device, protects the presprayed mixture inside the chamber 30 from any contact with the oxygen introduced separately into the furnace. The risks of ignition of the presprayed mixture in the chamber 30 are thus greatly reduced.

Furthermore, the reduced diameter D4 of the end 28 of the ejection nozzle for the prespraying gas creates a pressure drop making it possible to resist the back-filling of the nozzle 12 with liquid fuel in the event of stoppage in the prespraying gas feed.

In order to ensure good spatial homogeneity of the mixture presprayed at the outlet 20 into the working space, the length 18 is chosen to have a length L1 which is sufficient and especially greater than 10 mm.

In an alternative form, other means may be employed as a replacement for or as an addition to the gaseous prespraying stream emerging from the nozzle 12 in order to implement the prespraying inside the prespraying space defined by the chamber 30 may be used. For example, a rotary dish breaking up the liquid fuel may be employed, or else means for compressing the liquid fuel in order to impart great kinetic energy to it as it enters the chamber 30.

With a spraying device as described here drops whose diameters range from 10 $\mu$m to 1000 $\mu$m and in which approximately 50% of the drops have a diameter greater than 100 $\mu$m have been obtained at the outlet, in the case of an injected liquid fuel oil flow rate of between $\frac{1}{20}$ and $\frac{1}{10}$ of the flow rate of the gaseous prespraying stream.

Trials of the spraying device have made it possible to ascertain the magnitude of the speed of ejection of the spraying fluid into the working space. In normal operation this speed is between 5 m/s and 120 m/s.

The higher this speed is, the greater are the protective effects resulting from the outer gaseous vein 44. However, high speeds are detrimental to the attachment of the flame. The latter can then be improved by increasing the cross-sectional area offered by the end length 34 in contact with the working space, by increasing the thickness of the pipe, for example, or by providing the latter with a reentrant edge at the end. This allows a recirculation of oxidant and of hot gases to be created in front of the end of the length 34 and thus the attachment of the flame to be promoted.

It will be noted that the high speeds of ejection of the gaseous spraying stream promote the protection of the device against flame entries, but produce an increase in the temperature of the end length 34, whereas low speeds limit the protective effects but reduce the temperature of the length 34.

The spraying device described here permits the spraying of any liquid fuel which has a viscosity lower than 100 cSt. Furthermore, it can be employed in any burner, especially a burner of a glass melting furnace, to produce a long and soft attached flame. The oxidant may have an oxygen content of between 20% and 100%. This device allows the flame length and flame volume to be varied in a ratio of 1 to 4 by adjusting the various flow rates. In addition, its working range varies from 30% to 150% of the nominal flow rate of liquid fuel.

What is claimed is:

1. A process for spraying a liquid product into a working space, comprising the steps of:

prespraying of a liquid product together with a gaseous prespraying stream inside a prespraying space defined by an inner pipe having a first inside diameter at a first portion where the liquid product and the gaseous prespraying stream are introduced, and a second inside diameter, smaller than the first diameter, at an inner exit opening to the prespraying space and separated from the first portion of the prespraying space by a first length, the prespraying space including a second portion having a second length over which the prespraying space reduces in diameter from the first diameter to the second diameter, and a third portion having a third length that is of the second diameter to form a presprayed mixture, the gaseous prespraying stream being introduced centrally into the prespraying space through a nozzle having a fourth portion having a third inside diameter and a fifth portion opening into the first portion and having a fourth length and a fourth inside diameter, smaller than third diameter, and a sixth portion having a fifth length over which the nozzle reduces in diameter from the third diameter to the fourth diameter and the liquid being introduced annularly into the prespraying space through an annular opening defined by the inner pipe surrounding the nozzle and opening into the first portion;

spraying the presprayed mixture from the inner exit opening of the prespraying space directly into a separate working space;

spraying a gaseous spraying stream through an outer exit opening of an outer pipe annularly surrounding the inner pipe with the presprayed mixture such that the gaseous spraying stream and the presprayed mixture are sprayed in the working space, the outer pipe including a seventh portion having a fifth diameter, an eighth portion having a sixth length and a sixth diameter smaller than the fifth diameter, the outer exit opening being disposed at an end of the eighth portion, and a ninth portion having a seventh length and over which the outer pipe reduces in diameter from the fifth diameter to the sixth diameter.

2. The process for spraying according to claim 1, wherein the prespraying of the liquid includes prespraying the liquid together with a gaseous prespraying stream.

3. The process according to claim 1, wherein a speed of the gaseous spraying stream introduced into the working space is between 5 m/s and 120 m/s.

4. The process according to claim 1, wherein the liquid which is presprayed is fuel.

5. The process according to claim 1, wherein a pressure inside the prespraying space is from 1 to 5 bars higher than a pressure in the working space.

6. The process according to claim 1, wherein a ratio of a flow rate of the gaseous prespraying stream to a flow rate of the gaseous spraying stream is between 1 and 5.

7. The process according to claim 1, wherein gas compositions of the gaseous prespraying and the gaseous spraying streams are identical.

8. A device for spraying a liquid product into a working space, comprising:

an inner pipe defining a prespraying space, the prespraying space having a first inside diameter at a first portion where a liquid product and a gaseous prespraying stream are introduced to form a presprayed mixture, and a second inside diameter, smaller than the first diameter, at an inner exit opening to the prespraying space and separated from the first portion of the prespraying space by a first length, the prespraying space including a second portion having a second length over which the prespraying space reduces in diameter from the first diameter to the second diameter, and a third portion having a third length that is of the second diameter;

a nozzle through which the gaseous prespraying stream is introduced centrally into the prespraying space, the nozzle having a fourth portion having a third inside diameter and a fifth portion opening into the first portion and having a fourth length and a fourth inside diameter, smaller than third diameter, and a sixth portion having a fifth length over which the nozzle reduces in diameter from the third diameter to the fourth diameter;

an annular opening through which the liquid is introduced annularly into the prespraying space, the annular opening being defined by the inner pipe surrounding the nozzle and opening into the first portion;

a separate working space beginning at the inner exit opening;

an outer pipe annularly surrounding the inner pipe and having an outer exit opening through which a gaseous spraying stream is sprayed with the presprayed mixture such that the gaseous spraying stream and the presprayed mixture are sprayed as a sprayed mixture into the working space, the outer pipe including a seventh portion having a fifth diameter, an eighth portion having a sixth length and a sixth diameter smaller than the fifth diameter, the outer exit opening being disposed at an end of the eighth portion, and a ninth portion having a seventh length and over which the outer pipe reduces in diameter from the fifth diameter to the sixth diameter.

9. The device for spraying according to claim 8, wherein the outer exit opening and the inner exit opening are substantially coplanar, a plane of the outer exit opening and the inner exit opening being substantially perpendicular to a direction of flow of the sprayed mixture.

10. The device for spraying according to claim 8, wherein fourth diameter is between one quarter and quadruple the second diameter.

11. The device for spraying according to claim 8, further comprising means for adjusting flow rates of the gaseous prespraying stream and the gaseous spraying stream.

12. The device for spraying according to claim 8, wherein the second diameter is 2 mm.

13. The device for spraying according to claim 12, wherein the third length is at least 10 mm.

14. The device for spraying according to claim 13, wherein the fourth length is 2 mm.

15. The device for spraying according to claim 14, wherein an overall length of the prespraying space is less than 200 mm.

16. The device for spraying according to claim 8, wherein an overall length of the prespraying space is less than 200 mm.

17. The device for spraying according to claim 8, wherein the third length is at least 10 mm.

18. The device for spraying according to claim 8, wherein the fourth length is 2 mm.

* * * * *